(12) United States Patent
Nishihata et al.

(10) Patent No.: US 6,545,075 B2
(45) Date of Patent: *Apr. 8, 2003

(54) THERMOPLASTIC RESIN COMPOSITION

(75) Inventors: Naomitsu Nishihata, Fukushima (JP); Hiroyuki Sato, Fukushima (JP); Masahito Tada, Fukushima (JP)

(73) Assignee: Kureha Kagaku Kogyo K.K., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/554,869

(22) PCT Filed: Nov. 6, 1998

(86) PCT No.: PCT/JP98/05005

§ 371 (c)(1), (2), (4) Date: May 19, 2000

(87) PCT Pub. No.: WO99/27017

PCT Pub. Date: Jun. 3, 1999

(65) Prior Publication Data

US 2002/0107335 A1 Aug. 8, 2002

(30) Foreign Application Priority Data

Nov. 20, 1997 (JP) .............................. 9-334868
Feb. 12, 1998 (JP) ........................... 10-046207
Sep. 11, 1998 (JP) ........................... 10-274264

(51) Int. Cl.$^7$ ................................ C08K 5/24
(52) U.S. Cl. ................... 524/261; 524/262; 524/263; 524/265; 524/484; 524/538
(58) Field of Search ................. 524/538, 261, 524/262, 263, 265, 494

(56) References Cited

U.S. PATENT DOCUMENTS

| 4,528,346 A | | 7/1985 | Sugie et al. |
| 4,729,854 A | * | 3/1988 | Miyata ........................ 252/609 |
| 5,319,427 A | * | 6/1994 | Sakurai ....................... 355/285 |
| 5,387,652 A | | 2/1995 | Kawaki et al. |
| 6,183,869 B1 | * | 2/2001 | Okuda ..................... 428/411.1 |

FOREIGN PATENT DOCUMENTS

| CA | 1236642 | 5/1988 |
| JP | 59-164360 | 9/1984 |
| JP | 62-232457 | 10/1987 |
| JP | 63-33775 | 7/1988 |
| JP | 4-132765 | 5/1992 |
| JP | 6-45125 | 2/1994 |
| JP | 6-200154 | 7/1994 |
| JP | 6-306283 | 11/1994 |
| JP | 7-309957 | 11/1995 |

* cited by examiner

Primary Examiner—Edward J. Cain
(74) Attorney, Agent, or Firm—Dinsmore & Shohl LLP

(57) ABSTRACT

A thermoplastic resin composition improved in compatibility, molding or forming ability, melt-flow properties and mechanical properties, which comprises 100 parts by weight of a resin component containing 40 to 99 wt. % of a poly(arylene sulfide) (A) and 1 to 60 wt. % of polyamide-imide (B), and 0.01 to 10 parts by weight of a silane compound (C) containing at least one functional group selected from the group consisting of amino, ureido, epoxy, isocyanate and mercapto groups.

29 Claims, No Drawings

THERMOPLASTIC RESIN COMPOSITION

TECHNICAL FIELD

The present invention relates to a resin composition comprising poly(arylene sulfide) and a polyamide-imide, and particularly to a thermoplastic resin composition improved in compatibility, molding or forming ability, melt-flow properties and mechanical properties.

BACKGROUND ART

Poly(arylene sulfides) (hereinafter abbreviated as "PASs") represented by poly(phenylene sulfide) (hereinafter abbreviated as "PPS") are engineering plastics excellent in heat resistance, flame retardancy, chemical resistance, dimensional stability, mechanical properties and the like, and widely used electric and electronic parts, precision machinery parts, automotive parts, etc. However, the PASs have a comparatively low glass transition temperature and are greatly lowered in elastic modulus in a temperature range not lower than the glass transition temperature, so that their use has been limited in application fields of which high elastic modulus is required in a high temperature not lower than 100° C.

On the other hand, polyamide-imides are engineering plastics excellent in heat resistance, mechanical properties, electrical properties, chemical resistance and the like. However, most of them are difficult to injection-mold, and they have been mainly used in application fields of varnishes, films and the like in the past.

Japanese Patent Application Laid-Open No. 306283/1994 discloses that resin compositions improved in melt moldability can be provided without impairing their heat resistance by blending an aromatic polyamide-imide copolymer having a repeating units of a specific structure with PPS. Since PAS and polyamide-imide are poor in compatibility with each other, however, it has been difficult to obtain a resin composition having sufficient mechanical properties by simply blending them.

DISCLOSURE OF THE INVENTION

It is an object of the present invention to provide a thermoplastic resin composition comprising a poly(arylene sulfide) and polyamide-imide, improved in compatibility between both resins and having excellent molding or forming ability, melt-flow properties and mechanical properties.

Another object of the present invention is to provide a thermoplastic resin composition by which both elastic modulus of a poly(arylene sulfide) at a high temperature and injection moldability of polyamide-imide are improved, and the flash length upon injection molding is reduced.

The present inventors have carried out an extensive investigation with a view toward overcoming the above-described problems involved in the prior art. As a result, it has been found that when a silane compound having a specific functional group is added to a resin component comprising a PAS and polyamide-imide, compatibility between both resins is markedly improved, thereby providing a thermoplastic resin composition having excellent molding or forming ability, melt-flow properties and mechanical properties.

When the silane compound having the specific functional group is added in the case where a fibrous or non-fibrous filler, other resins and the like are incorporated into the resin component comprising the PAS and polyamide-imide, the compatibility of the respective components including the additive component with one another is markedly improved to provide a thermoplastic resin excellent in various properties.

According to the thermoplastic resin compositions according to the present invention, the elastic modulus of the PAS at a high temperature and the injection moldability and extrudability of the polyamide-imide are improved while making the best use of the flame retardancy, chemical resistance, dimension stability and mechanical properties brought about by the PAS, and the heat resistance, mechanical strength, electrical properties and chemical resistance brought about by the polyamide-imide.

The present invention has been led to completion on the basis of these findings.

According to the present invention, there is thus provided a thermoplastic resin composition comprising 100 parts by weight of a resin component containing 40 to 99 wt. % of a poly(arylene sulfide) (A) and 1 to 60 wt. % of polyamide-imide (B), and 0.01 to 10 parts by weight of a silane compound (C) containing at least one functional group selected from the group consisting of amino, ureido, epoxy, isocyanate and mercapto groups.

BEST MODE FOR CARRYING OUT THE INVENTION

Poly(arylene sulfide) (PAS):

The PAS useful in the practice of the present invention is an aromatic polymer having predominant repeating units of arylene sulfide represented by the formula [—Ar—S—] in which —Ar— means an arylene group. When the [—Ar—S—] is defined as 1 mole (basal mole), the PAS used in the present invention is a polymer containing this repeating unit in a proportion of generally at least 50 mol %, preferably at least 70 mol %, more preferably at least 90 mol %.

As examples of the arylene group, may be mentioned a p-phenylene group, a m-phenylene group, substituted phenylene groups (the substituent being preferably an alkyl group having 1 to 6 carbon atoms or a phenyl group), a p,p'-diphenylene sulfone group, a p,p'-biphenylene group, a p,p'-diphenylenecarbonyl group and a naphthylene group. As the PAS, a polymer predominantly having only the same arylene groups may preferably be used. However, a copolymer having two or more different arylene groups may be used from the viewpoint of processability and heat resistance.

Among these PASs, PPS having predominant repeating units of p-phenylene sulfide is particularly preferred because it is excellent in processability and industrially available with ease. Besides the PPS, poly(arylene ketone sulfides), poly(arylene ketone ketone sulfide) and the like may be used. As specific examples of copolymers, may be mentioned random or block copolymers having repeating units of p-phenylene sulfide and repeating units of m-phenylene sulfide, random or block copolymers having repeating units of phenylene sulfide and repeating units of arylene ketone sulfide, random or block copolymers having repeating units of phenylene sulfide and repeating units of arylene ketone ketone sulfide, and random or block copolymers having repeating units of phenylene sulfide and repeating units of arylene sulfone sulfide. These PASs are preferably crystalline polymers. The PASs are preferably linear, or slightly branched or crosslinked polymers from the viewpoints of toughness and strength.

Such a PAS can be obtained in accordance with any publicly known process (for example, Japanese Patent Publication No. 33775/1988) in which an alkali metal sulfide and a dihalogen-substituted aromatic compound are subjected to a polymerization reaction in a polar solvent.

As examples of the alkali metal sulfide, may be mentioned lithium sulfide, sodium sulfide, potassium sulfide, rubidium sulfide and cesium sulfide. Sodium sulfide formed by the reaction of NaSH and NaOH in the reaction system may also be used.

As examples of the dihalogen-substituted aromatic compound, may be mentioned p-dichlorobenzene, m-dichlorobenzene, 2,5-dichlorotoluene, p-dibromobenzene, 2,6-dichloronaphthalene, 1-methoxy-2, 5-dichlorobenzene, 4,4'-dichlorobiphenyl, 3,5-dichlorobenzoic acid, p,p'-dichlorodiphenyl ether, 4,4'-dichlorodiphenyl sulfone, 4,4'-dichlorodiphenyl ether, 4,4l-dichlorodiphenyl sulfone, 4,4'-dichlorodiphenyl sulfoxide and 4,4'-dichlorodiphenyl ketone. These compounds may be used either singly or in any combination thereof.

In order to introduce some branched or crosslinked structure into the PAS, a small amount of a polyhalogen-substituted aromatic compound having at least 3 halogen substituents per molecule may be used in combination. As preferable examples of the polyhalogen-substituted aromatic compounds, may be mentioned trihalogen-substituted aromatic compounds such as 1,2,3-trichlorobenzene, 1,2,3-tribromobenzene, 1,2,4-trichlorobenzene, 1,2,4-tribromobenzene, 1,3,5-trichlorobenzene, 1,3,5-tribromobenzene and 1,3-dichloro-5-brdmobenzene, and alkyl-substituted derivatives thereof. These compounds may be used either singly or in any combination thereof. Among these, 1,2,4-trichlorobenzene, 1,3,5-trichlorobenzene and 1,2,3-trichlorobenzene are preferred from the viewpoints of profitability, reactivity, physical properties and the like.

As the polar solvent, aprotic organic amide solvents typified by N-alkylpyrrolidones such as N-methyl-2-pyrrolidone (hereinafter abbreviated as NMP), 1,3-dialkyl-2-imidazolidinones, tetraalkylureas, and hexaalkylphosphoric triamides are preferred because they have high stability in the reaction system and are easy to provide a high-molecular weight polymer.

The PAS used in the present invention is a polymer having a melt viscosity within a range of generally from 10 to 500 Pa·s, preferably from 15 to 450 Pa·s as measured at a temperature of 310° C. and a shear rate of 1200/sec. If the melt viscosity of the PAS is too low, the mechanical properties of the resulting resin composition may possibly become insufficient. If the melt viscosity of the PAS is too high, the injection moldability and extrudability of the resulting resin composition may possibly become insufficient.

The PAS used in the present invention may be a polymer washed with water after completion of the polymerization. However, as the PAS, there may be preferably used a polymer treated with an aqueous solution containing an acid such as hydrochloric acid or acetic acid, or a mixed solution of water and an organic solvent, or a polymer subjected to a treatment with a solution of a salt formed of a weak acid and a weak base. In particular, the use of a PAS subjected to a washing treatment until its pH in a mixed solution of acetone/water prepared in a proportion of 1:2 comes to exhibit 8.0 or lower permits more improving the melt-flow properties and mechanical properties of the resulting resin composition.

The PAS used in the present invention is desirably in the form of particles having an average particle size of 100 μm or greater. If the average particle size of the PAS is too small, the feed rate of the resulting thermoplastic resin composition is limited upon melt extrusion through an extruder, so that the resin composition has a possibility that the residence time of the resin composition in the extruder may become long to cause problems of deterioration of the resins, and the like. In addition, such a too small particle size is not desirable from the viewpoint of production efficiency.

A blending proportion of the PAS in the resin composition according to the present invention is 40 to 99 wt. %, preferably 45 to 95 wt. %, more preferably 50 to 85 wt. % based on the total weight of the PAS and the polyamide-imide. If the blending proportion of the PAS is too low, the mechanical strength of the resulting resin composition is deteriorated, and moreover, the injection moldability and extrudability thereof become insufficient. If the blending proportion of the PAS is too high, not only the effect to improve elastic modulus at a high temperature of at least 150° C., but also the flash-inhibiting effect becomes insufficient.

Polyamide-imide:

The polyamide-imide (hereinafter may be referred to as "PAI") useful in the practice of the present invention is generally a polymer produced from an aromatic tricarboxylic acid anhydride and an aromatic diamine and having a structural form alternately containing an imide group and an amide group.

The polyamide-imide is generally a polymer having, as a main unit structure, a unit represented by the formula (1):

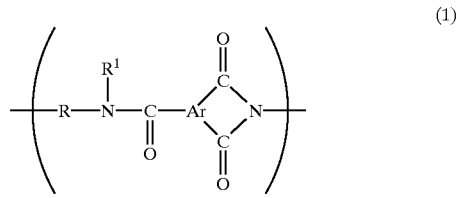

(1)

wherein Ar is a trivalent aromatic group containing at least one six-membered carbon ring, R is a bivalent aromatic or aliphatic group, and $R^1$ is a hydrogen atom or an alkyl or phenyl group. A part (preferably less than 50 mol %, more preferably less than 30 mol %) of the imide bond in the formula (1) may remain as an amide bond.

As the polyamide-imide used in the present invention, is particularly preferred a polymer having the repeating unit represented by the formula (1) in a proportion of 100 mol %. However, a copolymer containing other repeating units in a proportion of preferably at most 50 mol %, more preferably at most 30 mol % may also be used.

As examples of other repeating units, may be mentioned repeating units represented by the following formulae (2) to (4). The copolymer may contain one or more of these repeating units.

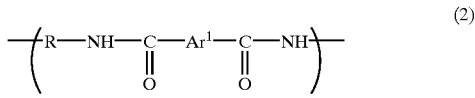

(2)

wherein $Ar^1$ is a bivalent aromatic or aliphatic group containing at least one six-membered carbon ring group, and R is a bivalent aromatic or aliphatic group;

(3)

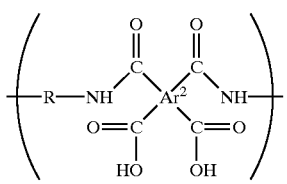

wherein Ar² is a tetravalent aromatic group containing at least one six-membered carbon ring group, and R is a bivalent aromatic or aliphatic group; and (4)

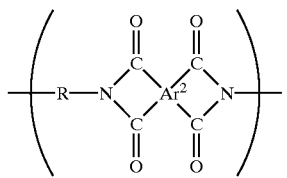

wherein Ar² is a tetravalent aromatic group containing at least one six-membered carbon ring group, and R is a bivalent aromatic or aliphatic group.

In the formula (1), specific examples of the trivalent aromatic group (Ar) include groups represented by the formulae (5) to (8):

(5) (6) (7) (8)

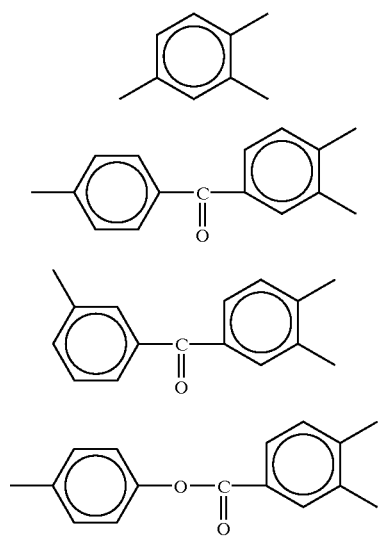

Among these, the group of the formula (5) is preferred.

Specific examples of the bivalent aromatic or aliphatic group (R) include the formulae (9) to (35):

(9) (10)

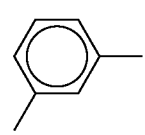

(11)

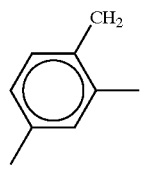

(12)

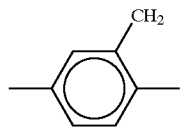

(13)

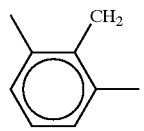

(14)

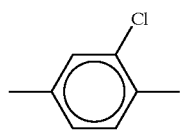

(15)

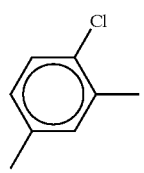

(16)

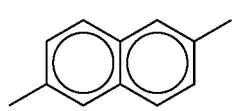

(17)

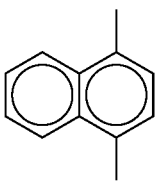

(18)

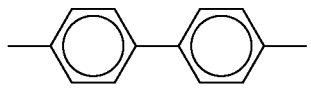

(19)

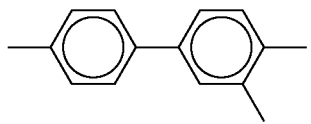

(20)

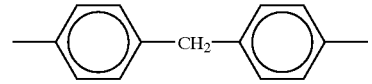

(21)

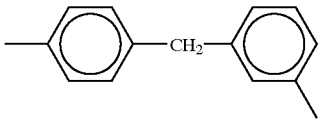

-continued

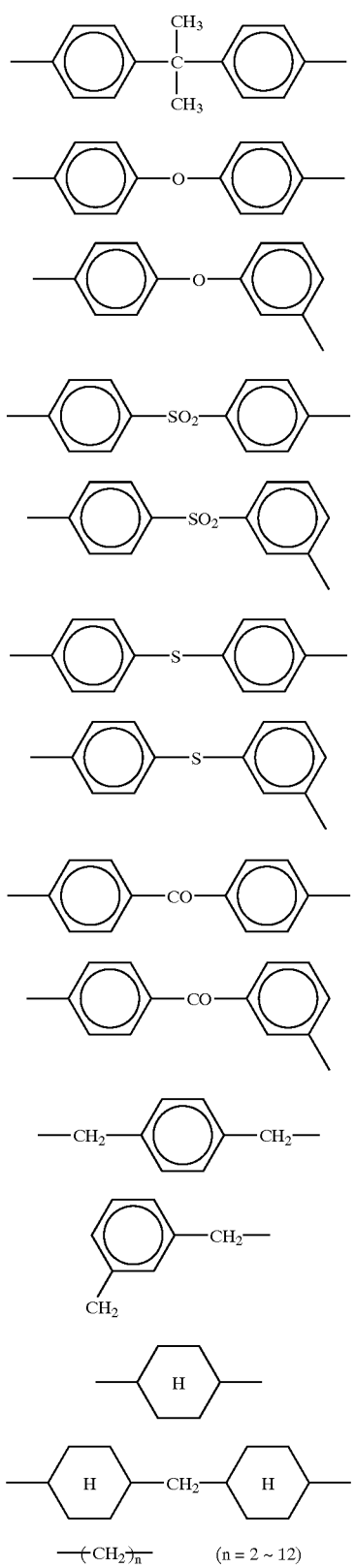

Among these, are preferred the groups represented by the formulae (9), (10), (11), (16), (17), (20), (23), (24), (27) and (28), and the groups represented by the formulae (9), (10), (11), (20), (23) and (24) are particularly preferred, with the groups represented by the formulae (9), (11) and (20) being most preferred.

In the formula (2), specific examples of $Ar^1$ include groups represented by the following formulae (36) to (41) in addition to the groups represented by the formulae (9), (10), (16), (17), (18), (19), (29), (30) and (35):

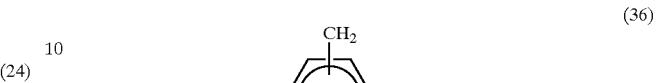

(36)

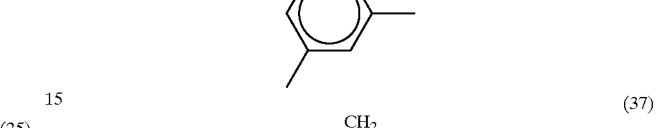

(37)

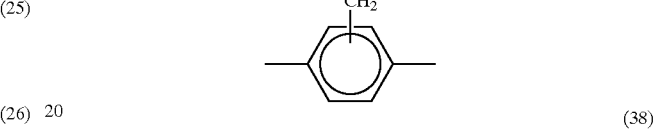

(38)

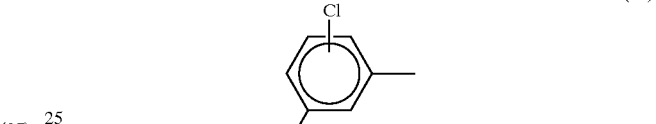

(39)

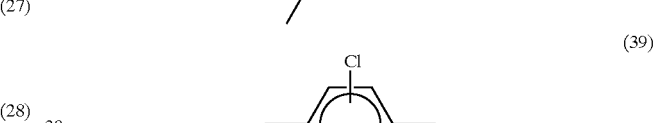

(40)

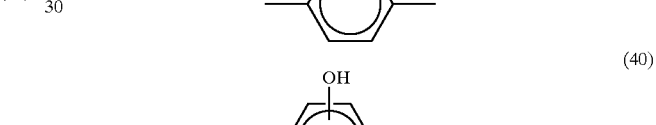

(41)

In the formulae (3) and (4), specific examples of $Ar^2$ include groups represented by the following formulae (42) and (43):

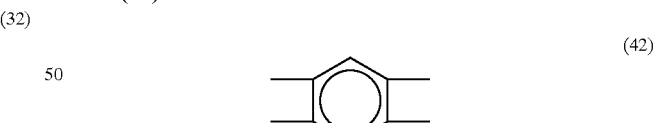

(42)

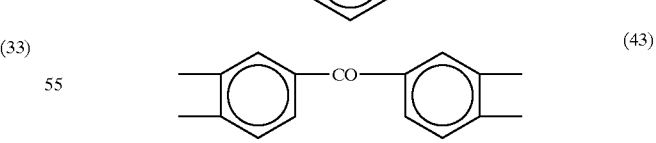

(43)

In the respective repeating units represented by the formulae (1) to (4), different groups respectively corresponding to Ar, $Ar^1$, $Ar^2$ or R may be present in the polyamide-imide.

The polyamide-imide may be produced in accordance with a process such as (a) a process in which an aromatic tricarboxylic acid anhydride halide and a diamine are reacted with each other in a solvent (an acid chloride process), (b) a process in which an aromatic tricarboxylic acid anhydride and a diamine are reacted with each other in a solvent (a direct polycondensation process), or (c) a process in which an aromatic tricarboxylic acid anhydride and a diisocyanate are reacted with each other in a solvent (an isocyanate process).

In the acid chloride process (a), at least two aromatic tricarboxylic acid anhydride halides and diamines may be used. Further, a dicarboxylic acid dichloride or aromatic tetracarboxylic acid anhydride may be reacted as needed. The reaction can be conducted either by reacting the reactants in the presence or absence of a hydrogen halide acceptor such as triethylamine and sodium hydroxide in a polar solvent such as NMP or by reacting the reactants in the presence of the hydrogen halide acceptor likewise in a mixed solvent of an organic solvent (for example, acetone) miscible at least in part with water and water.

In the direct polycondensation process (b), at least two aromatic tricarboxylic acid anhydrides and diamines may be used. Further, a dicarboxylic acid or aromatic tetracarboxylic acid anhydride may be reacted as needed. The reaction can be conducted in the presence or absence of a dehydration catalyst in a polar solvent such as NMP or without using any solvent.

In the isocyanate process (c), at least two aromatic tricarboxylic acid anhydrides and diisocyanates may be used. Further, a dicarboxylic acid or aromatic tetracarboxylic acid anhydride may be reacted as needed. The reaction can be conducted in a polar solvent such as NMP or without using any solvent. In this process, effective means for efficiently conducting the reaction, controlling the structure of a polymer to be formed and modifying the molecular weight of the polymer are, for example, to conduct the reaction in a water content strictly controlled, to control the reaction temperature by multi stages to conduct a reaction for forming an imide group after completion of a reaction for forming an amide group, to use a catalyst as needed, and to conduct the reaction under the strict control of a molar ratio of the acid anhydride compound to the carboxylic acid compound.

In each of the above-described processes, a monofunctional compound such as a monocarboxylic acid such as benzoic acid; an acid chloride such as benzoyl chloride; a dicarboxylic acid anhydride such as succinic anhydride or naphthalenedicarboxylic acid anhydride; a monoisocyanate such as phenyl isocyanate; or a phenol may be used for the purpose of modifying the molecular weight of a polymer to be formed or controlling the structure of terminals of the polymer. The polymer obtained in accordance with any one of the above-described processes may be subjected to a heat treatment for converting the amido acid structure into an imido ring as needed.

When the polymerization reaction is conducted in a solution, the polyamide-imide used in the present invention is collected by treating a solution or slurry after completion of the reaction with an alcohol such as methanol, ethanol or isopropanol; a ketone such as acetone or methyl ethyl ketone; an aliphatic hydrocarbon such as hexane; or an aromatic hydrocarbon such as benzene or toluene to precipitate and wash a polymer formed. The polymer may be collected by directly removing the solvent by evaporation after completion of the polymerization reaction to deposit a polymer formed and then washing the polymer with the solvent described above. In the isocyanate process, the solvent may be concentrated to some extend after completion of the polymerization reaction and then removed under reduced pressure by an extruder or the like.

The polyamide-imide used in the present invention may be a polymer produced in accordance with any process of the processes (a), (b) and (c). In the case where the resulting resin composition is used in injection molding or extrusion, however, the polyamide-imide prepared by the isocyanate process (c) may preferably be used from the viewpoints of easy structure control and molecular weight modification of the polymer formed. The polyamide-imide used in the present invention has a reduced viscosity of generally 0.10 to 1.50 dl/g, preferably 0.12 to 1.00 dl/g, more preferably 0.15 to 0.80 dl/g as determined by viscosity measurement at 30° C. and a polymer concentration of 1 g/dl in dimethylformamide.

A blending proportion of the polyamide-imide in the resin composition is 1 to 60 wt. %, preferably 5 to 55 wt. %, more preferably 15 to 50 wt. % based on the total weight of the PAS and the polyamide-imide. If the blending proportion of the polyamide-imide is too low, the effect to improve elastic modulus at a high temperature becomes insufficient. If the blending proportion of the PAS is too high, the mechanical strength of the resulting resin composition is deteriorated, and moreover, the injection moldability and extrudability thereof become insufficient.

Silane Compound:

The functional group-containing silane compound useful in the practice of the present invention is a silane compound containing at least one functional group selected from the group consisting of amino, ureido, epoxy, isocyanate and mercapto groups in its molecule. The functional group-containing silane compound may be generally a silane compound containing any one of these functional groups in its molecule. In some cases, it may be a silane compound containing two or more of these functional groups in its molecule. The silane compound used in the present invention is generally an alkoxysilane or halosilane containing such a functional group as described above in its molecule.

Specific examples of the functional group-containing silane compound include amino group-containing silane compounds such as γ-aminopropyltrimethoxysilane, γ-aminopropyltriethoxysilane, γ-aminopropylmethyldimethoxysilane, γ-aminopropylethyldiethoxysilane, γ-aminopropylmethyldiethoxysilane, N-(β-aminoethyl)-γ-aminopropyltrimethoxysilane, N-(β-aminoethyl)-γ-aminopropylmethyldimethoxysilane, γ-phenyl-γ-aminopropyltrimethoxysilane and γ-ureidopropyltriethoxysilane; ureido group-containing silane compounds such as γ-ureidopropyltrimethoxysilane, γ-ureidopropylmethyltrimethoxysilane, γ-ureidopropyltriethoxysilane, γ-ureidopropylmethyltriethoxysilane and γ-(2-ureidoethyl)-aminopropyltrimethoxysilane; epoxy group-containing silane compounds such as γ-glycidoxypropyltrimethoxysilane, γ-glycidoxypropyldimethylmethoxysilane, γ-glycidoxypropyltriethoxysilane, γ-glycidoxypropylmethyldiethoxysilane, β-(3,4-epoxycyclohexyl)ethyltrimethoxysilane and β-(3,4-epoxycyclohexyl)ethyltriethoxysilane; isocyanate group-containing silane compounds such as γ-isocyanatopropyltrimethoxysilane, γ-isocyanatopropylmethyldimethoxysilane, γ-isocyanatopropyltriethoxysilane, γ-isocyanatopropylmethyldiethoxysilane, γ-isocyanatopropylethyldimethoxysilane, γ-isocyanatopropylethyldiethoxysilane and γ-isocyanatopropyltrichlorosilane; and mercapto group-containing silane compounds such as γ-mercaptopropylmethyldimethoxysilane, γ-mercaptopropyltriethoxysilane, γ-mercaptopropylmethyldimethoxysilane, γ-mercaptopropylmethyldiethoxysilane, β-mercaptoethyltrimethoxysilane, β-mercaptoethyltriethoxysilane and β-mercaptoethyldimethoxysilane.

These functional group-containing silane compounds are preferably alkoxysilane compounds or halosilane compounds containing at least one functional group selected from the group consisting of amino, ureido, epoxy, isocyanate and mercapto groups. The functional group-containing alkoxysilane compounds are preferably functional group-substituted alkyl.alkoxysilane compounds having a functional group-substituted alkyl group and an alkoxy group. The functional group-substituted alkyl.alkoxysilane compounds are preferably silane compounds in which the functional group-substituted alkyl group has 1 to 4 carbon atoms, and the alkoxy group has 1 to 4 carbon atoms, namely, "functional group-substituted ($C_1$–$C_4$)alkyl.($C_1$–$C_4$) alkoxysilane compounds". As examples of such functional group-substituted alkyl.alkoxysilane compounds, may be mentioned γ-aminopropyl.trialkoxysilane compounds, γ-glycidoxypropyl.trialkoxysilanes, γ-mercaptopropyl.trialkoxysilanes, γ-isocyanatopropyl.trialkoxysilanes and γ-ureidopropyl trialkoxysilanes as those excellent in the effect of addition thereof and easy to be available.

These functional group-containing silane compounds may be used either singly or in any combination thereof. A compounding proportion of the functional group-containing silane compounds is 0.01 to 10 parts by weight, preferably 0.05 to 8 parts by weight, more preferably 0.1 to 5 parts by weight based on 100 parts by weight of the total amount of the PAS and the polyamide-imide. If the compounding proportion of these functional group-containing silane compounds is too low, the mechanical property-improving effect by the addition thereof becomes little. If the proportion is too high on the other hand, the resulting resin composition tends to generate gases in the course of molding or forming and processing, resulting in a molded or formed product liable to cause voids. In many cases, the functional group-containing silane compound can exhibit a sufficient effect in an amount of about 0.3 to 2 parts by weight per 100 parts by weight of the resin component. In the case where a great amount of a filler is blended, or the like, however, it is preferable to compound the functional group-containing silane compound in a relatively great amount into the resin component for achieving sufficient compatibility. The functional group-containing silane compound can exhibit its compatibility-improving effect in an amount of generally about 0.1 to 2 wt. %, preferably about 0.3 to 1 wt. % based on the total weight of the resin composition containing the resin component and various kinds of additives.

Organic Amide Compound:

When a small amount of an organic amide compound is added to the thermoplastic resin composition according to the present invention, the melt-flow properties and mechanical properties of the composition can be enhanced.

Examples of the organic amide compound include amides such as N,N-dimethylformamide and N,N-dimethylacetamide; N-alkylpyrrolidones or N-cycloalkylpyrrolidones such as N-methyl-2-pyrrolidone and N-cyclohexyl-2-pyrrolidone; N-alkylcaprolactams or N-cycloalkylcaprolactams such as N-methyl-ε-caprolactam and N-cyclohexylcaprolactam; caprolactams such as ε-caprolactam; N,N-dialkylimidazolidinones such as 1,3-dimethyl-2-imidazolidinone; tetraalkylureas such as tetramethylurea; and hexaalkylphosphoric triamides such as hexamethylphosphoric triamide. These organic amide compounds may be used either singly or in any combination thereof.

Among the organic amide compounds, the N-alkylpyrrolidones, N-cycloalkylpyrrolidones, N-alkylcaprolactams, N-cycloalkylcaprolactams, caprolactams and N,N-dialkylimidazolidinones are preferred, with the N-alkylpyrrolidones, caprolactams and N,N-dialkylimidazolidinones being particularly preferred.

The organic amide compound is compounded in a proportion of generally 0.01 to 10 parts by weight, preferably 0.1 to 8 parts by weight, more preferably 0.5 to 5 parts by weight per 100 parts by weight of the total amount of the PAS and the polyamide-imide. If the compounding proportion of the organic amide compound is too low, the effects of improving the melt-flow properties and mechanical properties become little. If the compounding proportion is too high, the strength of the resulting resin composition is lowered, and there is a possibility that unfavorable phenomena such as bleeding may be caused.

Other Thermoplastic Resins:

Into the resin compositions according to the present invention, may be added other thermoplastic resins within limits not impeding the objects of the present invention. The other thermoplastic resins are preferably thermoplastic resins stable at a high temperature.

As examples of the other thermoplastic resins, may be mentioned aromatic polyesters such as polyethylene terephthalate and polybutylene terephthalate; fluorocarbon resins such as polytetrafluoroethylene (PTFE), tetrafluoroethylene/hexafluoropropylene copolymers, tetrafluoroethylene/perfluoroalkyl vinyl ether copolymers, polychlorotrifluoroethylene, polyvinylidene fluoride, polyvinylidene fluoride/hexafluoropropylene copolymers, propylene/tetrafluoroethylene copolymers, vinylidene fluoride/chlorotrifluoroethylene copolymers and ethylene/hexafluoropropylene copolymers; polyolefins such as polyethylene and polypropylene; and polyacetal, polystyrene, polyamide, polycarbonate, polyphenylene ether, polyalkyl acrylate, ABS resins, polyvinyl chloride, liquid crystalline polyesters, poly(ether ether ketone), poly(ether ketone), polysulfone and poly(ether sulfone).

These thermoplastic resins may be used either singly or in any combination thereof. In many cases, however, the other thermoplastic resins are used in a small amount within limits not impeding the various properties of the resin composition of the PAS and the polyamide-imide. A preferable compounding proportion of the other thermoplastic resins is at most 50 parts by weight, more preferably at most 30 parts by weight per 100 parts by weight of the total amount of the PAS and the polyamide-imide.

Filler:

Into the thermoplastic resin compositions according to the present invention, may be compounded various kinds of fillers as needed. As examples of the fillers, may be mentioned fibrous fillers, such as inorganic fibrous materials such as glass fiber, carbon fiber, asbestos fiber, silica fiber, alumina fiber, zirconia fiber, boron nitride fiber, silicon nitride fiber, boron fiber and potassium titanate fiber (whisker); metallic fibrous materials such as stainless steel, aluminum, titanium, copper and brass; and high-melting organic fibrous materials (for example, Aramid fiber) such as polyamide, fluorocarbon resins, polyester resins and acrylic resins.

As examples of non-fibrous fillers, may be mentioned particulate, powdery or flaky fillers such as mica, silica, talc, alumina, kaolin, calcium sulfate, calcium carbonate, titanium oxide, magnetic powders (for example, ferrite), clay, glass powder, zinc oxide, nickel carbonate, iron oxide, quartz powder, magnesium carbonate and barium sulfate. Conductive fillers such as conductive carbon black may also be used as filler.

These fillers may be used either singly or in any combination thereof. The fillers may be treated with greige goods or surface-treating agents as needed. Examples of the greige goods or surface-treating agents ainclude functional compounds such as epoxy compounds, isocyanate compounds and titanate compounds. These compounds may be used for subjecting fillers to a surface treatment or collecting treatment in advance, or added at the same time upon the preparation of a resin composition.

In the thermoplastic resin compositions according to the present invention, as needed, these fillers may be compounded within a range of generally 0 to 800 parts by weight, preferably 0 to 500 parts by weight, more preferably 0 to 300 parts by weight per 100 parts by weight of the resin component. The compounding proportion of the fillers varies according to the intended functions of the resulting thermoplastic resin composition. When the thermoplastic resin composition is used as a magnetic material by compounding, for example, magnetic powder such as ferrite therein, the magnetic powder is generally compounded in a proportion of about 100 to 800 parts by weight per 100 parts by weight of the resin component. When the thermoplastic resin composition is used as a heat-conductive material by compounding a heat-conductive filler such as alumina, the filler is generally compounded in a proportion of about 50 to 300 parts by weight per 100 parts by weight of the resin component. In the case of electrically conductive carbon black, the carbon black is generally compounded in a proportion of about 1 to 100 parts by weight per 100 parts by weight of the resin component according to the desired volume resistivity of the resulting resin composition.

In particular, the compounding of an inorganic fibrous filler such as glass fiber permits the provision of a resin composition excellent in mechanical properties such as tensile strength, flexural strength, flexural modulus and maximum strain in bending. When the inorganic fibrous filler is compounded for improving these mechanical properties, it is compounded in a proportion of preferably 1 to 300 parts by weight, more preferably 5 to 150 parts by weight, particularly preferably 10 to 100 parts by weight per 100 parts by weight of the resin component.

The glass fiber-filled thermoplastic resin composition is suitable for use as an insulating material in a wide variety of fields. The carbon fiber-filled thermoplastic resin composition is suitable for use as an electrically conductive material or sliding material. The carbon black-filled thermoplastic resin composition is suitable for use as an electrically conductive material. The Aramid fiber-, PTFE- or potassium titanate whisker-filled thermoplastic resin composition is suitable for use as a sliding material. The alumina-filled thermoplastic resin composition is suitable for use as a heat-conductive material. The silica-filled thermoplastic resin composition is suitable for use as a sealing material. The ferrite-filled thermoplastic resin composition is suitable for use as a magnetic material.

At least two fibrous filler, at least two non-fibrous fillers, or at least one fibrous filler and at least one non-fibrous filler may be used in combination. Further, at least one other thermoplastic resin and at least one filler (fibrous filler and/or non-fibrous filler) may also be used in combination. Specific examples thereof include the combined use of at least one fibrous filler (for example, glass fiber) and electrically conductive carbon black, and the combined use of PTFE and potassium titanate fiber.

Other Additives:

Into the resin compositions according to the present invention, may be suitably added, for example, resin-modifying agents such as ethyleneglycidyl methacrylate, lubricants such as pentaerythritol tetrastearate, antioxidants, thermosetting resins, ultraviolet absorbents, nucleating agents such as boron nitride, flame retardants; colorants such as dyes and pigments, and the like as other additives than the above-described additives.

Thermoplastic Resin Composition:

The thermoplastic resin compositions according to the present invention can be prepared by equipment and methods generally used in the preparation of synthetic resin compositions. The resin composition can be prepared in accordance with, for example, a process comprising premixing the individual raw components by means of a Henschel mixer or tumbler, adding a filler such as glass fiber, as needed, to further continue the mixing, kneading the resultant mixture in a single-screw or twin-screw extruder and then extruding the kneaded mixture into pellets for molding. There may also be used a process in which part of the necessary components are mixed as a masterbatch, and the mixture is mixed with the remaining components, or a process in which part of raw materials used are ground for the purpose of enhancing the dispersibility of the individual components, thereby making the particle sizes of the components uniform, and they are mixed and melt-extruded.

The thermoplastic resin compositions according to the present invention can be molded or formed into sheets, films, tubes or other molded or formed products by applying the conventional melt processing techniques such as injection molding and extrusion to the compositions. The molded or formed products are excellent in stiffness at a temperature not lower than 150° C., flame retardancy, heat resistance, chemical resistance, dimensional stability, mechanical properties, and the like and can be used in a wide variety of fields of which these properties are required.

EXAMPLES

The present invention will hereinafter be described more specifically by the following Examples and Comparative Examples. However, the present invention is not limited to these examples only.

Incidentally, physical properties in the examples were determined or measured in accordance with the following respective methods.

(1) Tensile Properties (Tensile Strength and Tensile Elongation):

The tensile strength and tensile elongation (tensile elongation at break) of each resin composition sample were determined under conditions of a measuring temperature of 23° C., a gauge length of 50 mm and a cross-head speed of 5 mm/min in accordance with ASTM D 638.

(2) Flexural Properties (Flexural Modulus, Flexural Strength and Maximum Strain in Bending):

The flexural modulus, flexural strength and maximum strain in bending of each resin composition sample were determined under conditions of a measuring temperature of 23° C., a distance between supports of 80 mm and a cross-head speed of 3.5 mm/min in accordance with ASTM-D 790. Incidentally, the flexural modulus were determined at measuring temperature of 23° C. and 150° C. in some cases. The measured values in such a case were indicated with the temperature followed thereto.

(3) Melt Viscosity:

The melt viscosity of each resin composition sample was measured under conditions of a temperature of 310° C. and a shear rate of 1,200/sec by means of a "Capirograph" (manufactured by Toyo Seiki Seisakusho, Ltd.).

(4) pH of PAS:

The pH of each PAS sample was measured in a 1:2 mixed solvent of acetone and water. More specifically, 50 ml of acetone were added to 20 g of the polymer to vigorously mix them. After 100 ml of ion-exchanged water were further added to shake the resulting mixture for 30 minutes by a shaker, 60 ml of a supernatant liquid was taken out to measure a pH thereof.

(5) Extrudability:

Whether extrudability was good or poor was judged from the state of extrusion upon melting and kneading each resin composition sample in a twin-screw extruder 45 mm in diameter in accordance with the following standard:

Good: The resin composition can be fed without hindrance;

Poor: Bite into the screws is poor, so that bridging occurs in a feed opening, thereby causing a scatter of extrusion rate.

(6) Evaluation Method of Flash Length:

A pellet-like extrudate obtained by melt extrusion was used and injection-molded in a mold having a cavity 70 mm in diameter and 3 mm in thickness and kept at a temperature of 150° C. under a pressure 1.05 times as high as the minimum hold pressure under which the resin composition was completely charged into the mold, thereby measuring the length of flash occurred in a clearance (slit for evaluating flash length) 20 $\mu$m in thickness and 5 mm in width, which was provided at a circumferential part of the mold, by means of a magnifying projector.

(7) Volume Resistivity:

Measured in accordance with JIS K 6911 and JIS K 7194.

Synthesis Example 1

Synthesis of PAS (A)

A polymerizer was charged with 720 kg of N-methyl-2-pyrrolidone (NMP) and 420 kg of sodium sulfide pentahydrate containing 46.21 wt. % of sodium sulfide ($Na_2S$). After purged with nitrogen gas, the temperature of the reaction system was gradually raised to 200° C. with stirring to distill off 158 kg of water. At this time, 62 moles of $H_2S$ were volatilized off. After the dehydration step described above, the polymerizer was charged with 371 kg of p-dichlorobenzene (hereinafter abbreviated as "pDCB") and 189 kg of NMP to conduct a reaction at 220° C. for 4.5 hours with stirring. While continuing the stirring, 49 kg of water were then introduced under pressure into the polymerizer, and the contents were heated to 255° C. to conduct a reaction for 5 hours. After completion of the reaction, the reaction mixture was cooled near to room temperature, and the contents were sifted through a screen of 100 mesh to collect a granular polymer. The thus-collected granular polymer was washed twice with acetone and 3 times with water, thereby obtaining a washed polymer. This washed polymer was further washed with a 0.6% aqueous solution of ammonium chloride and then washed with water. After dehydration, the collected granular polymer was dried at 105° C. for 3 hours. The yield of the polymer [PAS (A)] thus obtained was 92%, and it had a melt viscosity of 55 Pa·s, a pH of 6.2 and an average particle size of about 500 $\mu$m.

Synthesis Example 2

Synthesis of PAS (B)

A polymerizer was charged with 720 kg of NMP and 420 kg of sodium sulfide pentahydrate containing 46.21 wt. % of sodium sulfide ($Na_2S$). After purged with nitrogen gas, the temperature of the reaction system was gradually raised to 200° C. with stirring to distill off 160 kg of water. At this time, 62 moles of $H_2S$ were volatilized off at the same time.

After the dehydration step described above, the polymerizer was charged with 364 kg of pDCB and 250 kg of NMP to conduct a reaction at 220° C. for 4.5 hours with stirring. While continuing the stirring, 59 kg of water were then introduced under pressure into the polymerizer, and the contents were heated to 255° C. to conduct a reaction for 5 hours. After completion of the reaction, the reaction mixture was cooled near to room temperature, and the contents were sifted through a screen of 100 mesh to collect a granular polymer. The thus-collected granular polymer was washed twice with acetone and 3 times with water, thereby obtaining a washed polymer. This washed polymer was further washed with a 3% aqueous solution of ammonium chloride and then washed with water. After dehydration, the collected granular polymer was dried at 105° C. for 3 hours. The yield of the polymer [PAS (B)] thus obtained was 89%, and it had a melt viscosity of 140 Pa·s, a pH of 6.5 and an average particle size of about 900 $\mu$m.

Synthesis Example 3

Synthesis of PAS (C)

A polymerizer was charged with 500 kg of NMP and 435 kg of sodium sulfide pentahydrate containing 46.21 wt. % of sodium sulfide ($Na_2S$). After purged with nitrogen gas, the temperature of the reaction system was gradually raised to 200° C. with stirring to distill off 150 kg of water. At this time, 45 moles of $H_2S$ were volatilized off at the same time.

After the dehydration step described above, the polymerizer was charged with 395 kg of pDCB and 320 kg of NMP to conduct a reaction at 220° C. for 3.5 hours with stirring. While continuing the stirring, 35 kg of water were then introduced under pressure into the polymerizer, and the contents were heated to 255° C. to conduct a reaction for 5 hours. After completion of the reaction, the reaction mixture was cooled near to room temperature, and the contents were sifted through a screen of 100 mesh to collect a granular polymer. The thus-collected granular polymer was washed twice with acetone and 3 times with water, thereby obtaining a washed polymer. This washed polymer was further washed with a 1% aqueous solution of acetic acid and then washed several times with water. After dehydration, the collected granular polymer was dried at 105° C. for 3 hours. The yield of the polymer [PAS (C)] thus obtained was 94%, and it had a melt viscosity of 24 Pa·s, a pH of 6.1 and an average particle size of about 300 $\mu$m.

Synthesis Example 4

Synthesis of Polyamide-imide (PAI)

A 20-liter reactor equipped with a stirrer, a thermometer and a gas inlet tube was charged with 10 liters of NMP and then with 2 kg of trimellitic anhydride at room temperature while introducing dry nitrogen. At this point of time, the water content in the system was 45 ppm. While introducing nitrogen, 1.81 kg of 2,4-tolylene diisocyanate were immediately added, and the contents were heated from room temperature to 90° C. over 30 minutes. At this temperature, a reaction was conducted for 60 minutes. Thereafter, the reaction mixture was heated further to 115° C. over 20 minutes to continue the reaction for 8 hours while keeping this temperature.

After completion of the reaction, the polymer solution thus obtained was divided into halves, and 10 liters of NMP was added to each solution to dilute it. The each polymer solution was then added dropwise to 40 liters of methanol stirred at high speed. Each polymer deposited was collected by suction filtration, dispersed again in 40 liters of methanol and then collected by filtration. After this process was conducted twice repeatedly, the whole collected polymer was dried under reduced pressure at 200° C. to obtain a powdery polymer. With respect to the polymer thus obtained, absorption derived from an amide group and an imide group was confirmed by the infrared absorption spectrum. The reduced viscosity (as determined by viscosity measurement at 30° C. and a polymer concentration of 1 g/dl in dimethylformamide) was 0.22 dl/g. The glass transition temperature (as measured by a differential scanning calorimeter) of this polymer was 323° C.

Examples 1 to 6 and Comparative Examples 1 to 7

After their corresponding respective components shown in Tables 1 and 2 were uniformly dry blended in a Henschel mixer, the resultant blends were respectively fed to a twin-screw kneader extruder (PCM-45, manufactured by Ikegal Corp.) having a diameter of 45 mm and kneaded at a cylinder temperature of 260 to 340° C., thereby obtaining pellet-like extrudates. The pellet-like extrudates thus obtained were dried at 150° C. for 6 hours and then molded at a mold temperature of 145° C. and a cylinder temperature of 300 to 340° C. by an injection molding machine (IS-75, manufactured by Toshiba Machine Co., Ltd.) to form specimens for tensile test and flexural test. The formulations of the resin compositions and the measured results are shown in Tables 1 and 2.

TABLE 1

| | | | | Ex. 1 | Comp. Ex. 1 | Ex. 2 | Comp. Ex. 2 | Ex. 3 | Ex. 4 | Comp. Ex. 3 |
|---|---|---|---|---|---|---|---|---|---|---|
| Formulation | Resin | PAS (A) | (%) | — | — | 83.3 | 83.3 | 75.0 | 75.0 | 75.0 |
| | | PAS (B) | (%) | 60.0 | 60.0 | — | — | — | — | — |
| | | PAS (D) | (%) | — | — | — | — | — | — | — |
| | | PAI | (%) | 40.0 | 40.0 | 16.7 | 16.7 | 25.0 | 25.0 | 25.0 |
| | Aminoalkoxysilane (part) | | | 0.7 | — | 0.8 | — | 0.8 | 0.8 | — |
| | Additive | Glass fiber | (part) | — | — | 66.7 | 66.7 | 66.7 | 66.7 | 66.7 |
| | | Organic amide compound | (part) | — | — | — | — | — | 1.7 | — |
| Physical property | Extrudability | | | Good | Good | Good | Good | Good | Good | Good |
| | Tensile strength MPa | | | 89 | 56 | 190 | 169 | 187 | 192 | 149 |
| | Tensile elongation % | | | 5.60 | 2.20 | 1.35 | 1.15 | 1.44 | 1.34 | 0.99 |
| | Flexural strength MPa | | | — | — | 235 | 227 | 233 | 242 | 217 |
| | Flexural modulus MPa | 23° C. | | — | — | 14050 | 13970 | 14630 | 14490 | 13970 |
| | | 150° C. | | — | — | — | — | — | — | — |
| | Maximum strain in bending % | | | — | — | 1.78 | 1.67 | 1.68 | 1.75 | 1.59 |
| | Melt viscosity Pa · s | | | 310 | 280 | 145 | 129 | 222 | 174 | 158 |

TABLE 2

| | | | | Ex. 5 | Comp. Ex. 4 | Ex. 6 | Comp. Ex. 5 | Comp. Ex. 6 | Comp. Ex. 7 |
|---|---|---|---|---|---|---|---|---|---|
| Formulation | Resin | PAS (A) | (%) | 58.3 | 58.3 | 50.0 | 50.0 | — | 100.0 |
| | | PAS (B) | (%) | — | — | — | — | — | — |
| | | PAS (D) | (%) | — | — | — | — | 50.0 | — |
| | | PAI | (%) | 41.7 | 41.7 | 50.0 | 50.0 | 50.0 | — |
| | Aminoalkoxysilane (part) | | | 0.8 | — | 1.0 | — | — | — |
| | Additive | Glass fiber | (part) | 66.7 | 66.7 | 66.7 | 66.7 | 66.7 | 66.7 |
| | | Organic amide compound | (part) | — | — | — | — | — | — |
| Physical property | Extrudability | | | Good | Good | Good | Good | Poor | Good |
| | Tensile strength MPa | | | 165 | 140 | 160 | 115 | 98 | 185 |
| | Tensile elongation % | | | 1.18 | 0.94 | 1.15 | 0.75 | 0.68 | 1.40 |
| | Flexural strength MPa | | | 235 | 204 | 228 | 175 | 145 | 235 |
| | Flexural modulus MPa | 23° C. | | 14870 | 14900 | 14200 | 14110 | 14520 | 14000 |
| | | 150° C. | | 7500 | 7500 | — | — | — | 5200 |
| | Maximum strain in bending % | | | 1.55 | 1.39 | 1.28 | 0.95 | 0.85 | 1.75 |
| | Melt viscosity Pa · s | | | 389 | 353 | 480 | 420 | 368 | 140 |

(Note)
(1) Formulation: The proportions of PAS and PAI designate wt. % (total: 100 wt. %), and the proportions of the other components designate parts or parts by weight per 100 parts by weight of the total amount of PAS and PAI.
(2) PAS (A): PPS (melt viscosity=55 Pa·s, pH=6.2, average particle size=about 500 μm) synthesized in Synthesis Example 1.
(3) PAS (B): PPS (melt viscosity=140 Pa·s, pH=6.5, average particle size=about 900 μm) synthesized in Synthesis Example 2.
(4) PAS (D): Commercially available PPS (T-2, product of Toprene Co.; melt viscosity=580 Pa·s, pH=8.6, average particle size=100 μm or smaller).
(5) PAI: Polyamide-imide (reduced viscosity=0.22 dl/g, glass transition temperature=323° C.) synthesized in Synthesis Example 4.
(6) Aminoalkoxysilane: γ-aminopropyltriethoxysilane (TSL8331, product of Toshiba Silicone Co., Ltd.)
(7) Glass fiber: product of Nippon Electric Glass Co., Ltd.; diameter=13 μm)
(8) Organic amide compound: ε-caprolactam.

As apparent from the experimental results shown in Tables 1 and 2, the resin compositions (Examples 1 to 6) to which the aminoalkoxysilane was added are excellent in tensile strength and tensile elongation compared with their corresponding resin compositions (Comparative Examples 1 to 6) in which no aminoalkoxysilane was added. Further, the resin compositions (Examples 2 to 6) into which glass fiber was compounded are also improved in flexural strength and maximum strain in bending. The resin composition (Example 4) into which the organic amide compound (ε-caprolactam) was compounded is further improved in melt-flow properties (lower melt viscosity) and mechanical properties.

The resin composition (Comparative Example 6) which has a high melt viscosity and a high pH and into which no aminoalkoxysilane was added is poor in extrudability and also insufficient in mechanical properties. In the molded products obtained by injection molding in Examples 1 to 6, the flash length was small compared with those obtained in Comparative Examples 1 to 6.

The resin composition (Comparative Example 7) into which only PAS and glass fiber were compounded, and no polyamide-imide was not compounded was low in flexural modulus at 150° C. and insufficient in stiffness at a high temperature compared with the resin composition (Example 5) in which the polyamide-imide, glass fiber and aminoalkoxysilane were compounded into the PAS. In the resin composition according to Example 5, the flexural modulus at ordinary and high temperatures is equal to that of the resin composition (Comparative Example 4) into which no aminoalkoxysilane was compounded, but the tensile strength, tensile elongation, flexural strength and maximum strain in bending are markedly improved.

Examples 7 to 14 and Comparative Examples 8 to 15

Specimens for tensile test and flexural test were produced in the same manner as in Examples 1 to 6 except that the formulations were changed to their corresponding formulations shown in Tables 3 and 4. The formulations of the resin compositions and the measured results are shown in Tables 3 and 4.

TABLE 3

| | | | | Ex. 7 | Comp. Ex. 8 | Ex. 8 | Comp. Ex. 9 | Ex. 9 | Comp. Ex. 10 | Ex. 10 | Comp. Ex. 11 |
|---|---|---|---|---|---|---|---|---|---|---|---|
| Formulation | Resin | PAS (A) | (%) | 61.0 | 61.0 | — | — | — | — | — | — |
| | | PAS (B) | (%) | — | — | — | — | 60.0 | 60.0 | — | — |
| | | PAS (C) | (%) | — | — | 60.0 | 60.0 | — | — | 63.0 | 63.0 |
| | | PAI | (%) | 39.0 | 39.0 | 40.0 | 40.0 | 40.0 | 40.0 | 37.0 | 37.0 |
| | Aminoalkoxysilane (part) | | | 0.9 | — | 1.1 | — | 0.7 | — | 0.9 | — |
| | Additive | PETS | (part) | 0.6 | 0.6 | 0.7 | 0.7 | — | — | — | — |
| | | Glass fiber | (part) | — | — | 70.0 | 70.0 | — | — | — | — |
| | | Carbon fiber | (part) | 43.0 | 43.0 | — | — | — | — | — | — |
| | | Aramid fiber | (part) | — | — | — | — | 11.0 | 11.0 | — | — |
| | | Carbon black | (part) | — | — | 3.5 | 3.5 | — | — | — | — |
| | | PTFE | (part) | — | — | — | — | — | — | 25.0 | 25.0 |
| | | Alumina | (part) | — | — | — | — | — | — | — | — |
| | | Silica | (part) | — | — | — | — | — | — | — | — |
| | | Ferrite | (part) | — | — | — | — | — | — | — | — |
| | | Potassium titanate | (part) | — | — | — | — | — | — | — | — |
| Physical property | Tensile strength MPa | | | 155 | Failure in molding | 136 | 82 | 90 | 68 | 84 | Failure in molding |
| | Tensile elongation % | | | 0.47 | | 0.5 | 0.3 | 9.8 | 3.2 | 2.9 | |
| | Flexural strength (23° C.) MPa | | | 225 | | 202 | 132 | — | — | — | |
| | Flexural modulus (23° C.) MPa | | | 21500 | | 14750 | 12560 | — | — | — | |
| | Maximum strain in bending % | | | 1.2 | | 1.4 | 1.1 | — | — | — | |
| | Melt viscosity Pa·s | | | 487 | 755 | 510 | 793 | 385 | 342 | 465 | 740 |
| | Volume resistivity Ω·cm | | | 11.2 | — | 88 | 1.0E+15 | — | — | — | — |

TABLE 4

| | | | | Ex. 11 | Comp. Ex. 12 | Ex. 12 | Comp. Ex. 13 | Ex. 13 | Comp. Ex. 14 | Ex. 14 | Comp. Ex. 15 |
|---|---|---|---|---|---|---|---|---|---|---|---|
| Formulation | Resin | PAS (A) | (%) | — | — | — | — | — | — | 60.0 | 60.0 |
| | | PAS (B) | (%) | — | — | — | — | — | — | — | — |
| | | PAS (C) | (%) | 60.0 | 60.0 | 60.0 | 60.0 | 60.0 | 60.0 | — | — |
| | | PAI | (%) | 40.0 | 40.0 | 40.0 | 40.0 | 40.0 | 40.0 | 40.0 | 40.0 |
| | Aminoalkoxysilane (part) | | | 1.0 | — | 1.7 | — | 7.1 | — | 0.8 | — |
| | Additive | PETS | (part) | — | — | — | — | — | — | — | — |
| | | Glass fiber | (part) | — | — | — | — | — | — | — | — |
| | | Carbon fiber | (part) | — | — | — | — | — | — | — | — |
| | | Aramid fiber | (part) | — | — | — | — | — | — | — | — |
| | | Carbon black | (part) | — | — | — | — | — | — | — | — |
| | | PTFE | (part) | — | — | — | — | — | — | 20.0 | 20.0 |
| | | Alumina | (part) | 233.0 | 233.0 | — | — | — | — | — | — |
| | | Silica | (part) | — | — | 67.0 | 67.0 | — | — | — | — |
| | | Ferrite | (part) | — | — | — | — | 567.0 | 567.0 | — | — |
| | | Potassium titanate | (part) | — | — | — | — | — | — | 13.3 | 13.3 |

TABLE 4-continued

|  |  | Ex. 11 | Comp. Ex. 12 | Ex. 12 | Comp. Ex. 13 | Ex. 13 | Comp. Ex. 14 | Ex. 14 | Comp. Ex. 15 |
|---|---|---|---|---|---|---|---|---|---|
| Physical property | Tensile strength MPa | — | — | — | — | — | Failure in molding | — | — |
|  | Tensile elongation % | — | — | — | — | — |  | — | — |
|  | Flexural strength (23° C.) MPa | 65 | 30 | 72 | 45 | 65 |  | 127 | 110 |
|  | Flexural modulus (23° C.) MPa | 22090 | 20050 | 6000 | 6050 | 19800 |  | 7420 | 7500 |
|  | Maximum strain in bending % | — | — | — | — | — |  | 2.7 | 1.8 |
|  | Melt viscosity Pa·s | 450 | 480 | 210 | 190 | 350 | 300 | 332 | 310 |
|  | Volume resistivity Ω·cm | — | — | — | — | — | — | — | — |

(Note)
(1) Formulation: The proportions of PAS and PAI designate wt. % (total: 100 wt. %), and the proportions of the other components designate parts or parts by weight per 100 parts by weight of the total amount of PAS and PAI.
(2) PAS (A): PPS (melt viscosity=55 Pa·s, pH=6.2, average particle size=about 500 μm) synthesized in Synthesis Example 1.
(3) PAS (B): PPS (melt viscosity=140 Pa·s, pH=6.5, average particle size=about 900 μm) synthesized in Synthesis Example 2.
(4) PAS (C): PPS (melt viscosity=24 Pa·s, pH=6.1, average particle size about 300 μm) synthesized in Synthesis Example 3.
(5) Polyamide-imide: Polyamide-imide (reduced viscosity=0.22 dl/g, glass transition temperature=323° C.) synthesized in accordance with the isocyanate process in Synthesis Example 4.
(6) Aminoalkoxysilane: γ-aminopropyltriethoxysilane (TSL8331, product of Toshiba Silicone Co., Ltd.).
(7) PETS: Unistar 11476, product of Nippon Oil & Fats Co., Ltd.; pentaerythritol tetrastearate (lubricant).
(8) Glass fiber: product of Nippon Electric Glass Co., Ltd.; diameter=13 μm)
(9) Carbon fiber: PAN type Carbon Fiber CFC-E3, product of Lignite Co.
(10) Aramid fiber: Technola T-322EP, product of Teijin Limited.
(11) Carbon black: Ketjen Black EC600JD, product of Lion Corporation (DBP oil absorption=500 ml/100 g).
(12) PTFE: Polytetrafluoroethylene, KT-400M, product of K.K. Kitamura.
(13) Alumina: AS-50, product of Showa Denko K.K.
(14) Silica: FB-74, product of Denki Kagaku Kogyo Kabushiki Kaisha.
(15) Ferrite: NP-20, product of Nippon Bengara Kogyo Co., Ltd.
(16) Potassium titanate: D102 (whisker), product of Tismo Co.

As apparent from the experimental results shown in Tables 3 and 4, when the aminoalkoxysilane compound was added to the resin compositions into which the carbon fiber (fibrous filler), PTFE (fluorocarbon resin) and ferrite (inorganic filler) were respectively compounded (Examples 7, 10 and 13), the resin compositions were able to be subjected to molding and exhibited excellent melt-flow properties and mechanical properties. On the other hand, when no aminoalkoxysilane compound was added (Comparative Examples 8, 11 and 14), such resin compositions were unable to retain the form of molded articles, and the melt-flow properties were also poor.

When the aminoalkoxysilane compound was added to the resin compositions into which the glass fiber and carbon black, the Aramid fiber, the alumina, the silica, and the PTFE and potassium titanate whisker were respectively compounded (Examples 8, 9, 11, 12 and 14), the flow properties and mechanical properties were improved to a great extent compared with their corresponding resin compositions to which no aminoalkoxysilane compound was added (Comparative Examples 9, 10, 12, 13 and 15). In the case of the resin compositions into which the glass fiber and carbon black were compounded, the electrical resistivity can be greatly lowered by compounding the aminoalkoxysilane (Example 8) even when only a small amount of the carbon black was compounded, as compared with the case where no aminoalkoxysilane was added (Comparative Example 9).

Examples 15 to 23 and Comparative Examples 16 to 22

Specimens for tensile test and flexural test were produced in the same manner as in Examples 1 to 6 except that the formulations were changed to their corresponding formulations shown in Tables 5 and 6. The formulations of the resin compositions and the measured results are shown in Tables 5 and 6.

TABLE 5

|  |  |  |  | Ex. 15 | Comp. Ex. 16 | Ex. 16 | Comp. Ex. 17 | Ex. 17 | Ex. 18 | Ex. 19 | Ex. 20 |
|---|---|---|---|---|---|---|---|---|---|---|---|
| Formulation | Resin | PAS (A) | (%) | — | — | 75.0 | 75.0 | 58.3 | 58.3 | 58.3 | 58.3 |
|  |  | PAS (B) | (%) | 60.0 | 60.0 | — | — | — | — | — | — |
|  |  | PAS (C) | (%) | — | — | — | — | — | — | — | — |
|  |  | PAI | (%) | 40.0 | 40.0 | 25.0 | 25.0 | 41.7 | 41.7 | 41.7 | 41.7 |
|  | Silane compound | Epoxysilane | (part) | 0.7 | — | 0.8 | — | 1.2 | 1.2 | — | — |
|  |  | Mercaptosilane | (part) | — | — | — | — | — | — | 1.2 | — |
|  |  | Isocyanatosilane | (part) | — | — | — | — | — | — | — | 1.2 |
|  |  | Ureidosilane | (part) | — | — | — | — | — | — | — | — |
|  | Additive | Glass fiber | (part) | — | — | 66.7 | 66.7 | 66.7 | 66.7 | 66.7 | 66.7 |
|  |  | Organic amide compound | (part) | — | — | — | — | — | 1.7 | — | — |

TABLE 5-continued

|  |  |  | Ex. 15 | Comp. Ex. 16 | Ex. 16 | Comp. Ex. 17 | Ex. 17 | Ex. 18 | Ex. 19 | Ex. 20 |
|---|---|---|---|---|---|---|---|---|---|---|
| Physical property | Tensile strength MPa | | 90 | 56 | 198 | 149 | 170 | 172 | 164 | 168 |
| | Tensile elongation % | | 6.50 | 2.20 | 1.75 | 0.99 | 1.40 | 1.42 | 1.25 | 1.31 |
| | Flexural strength MPa | | — | — | 245 | 217 | 235 | 238 | 218 | 222 |
| | Flexural modulus MPa | 23° C. | — | — | 14500 | 13970 | 14540 | 14900 | 14850 | 14790 |
| | | 150° C. | — | — | — | — | 7500 | 7500 | 7500 | 7500 |
| | Maximum strain in bending % | | — | — | 2.15 | 1.59 | 1.70 | 1.75 | 1.58 | 1.62 |
| | Melt viscosity Pa·s | | 270 | 280 | 145 | 158 | 310 | 260 | 335 | 340 |
| | Flash length μm | | — | — | 38 | 60 | 15 | 14 | 15 | 15 |

TABLE 6

|  |  |  |  | Ex. 21 | Comp. Ex. 18 | Ex. 22 | Comp. Ex. 19 | Ex. 23 | Comp. Ex. 20 | Comp. Ex. 21 | Comp. Ex. 22 |
|---|---|---|---|---|---|---|---|---|---|---|---|
| Formulation | Resin | PAS (A) | (%) | 58.3 | 58.3 | — | — | 50.0 | 50.0 | 100.0 | — |
| | | PAS (B) | (%) | — | — | — | — | — | — | — | — |
| | | PAS (C) | (%) | — | — | 58.3 | 58.3 | — | — | — | 100.0 |
| | | PAI | (%) | 41.7 | 41.7 | 41.7 | 41.7 | 50.0 | 50.0 | — | — |
| | Silane compound | Epoxysilane | (part) | — | — | 1.2 | — | 1.0 | — | — | — |
| | | Mercaptosilane | (part) | — | — | — | — | — | — | — | — |
| | | Isocyanatosilane | (part) | — | — | — | — | — | — | — | — |
| | | Ureidosilane | (part) | 1.2 | — | — | — | — | — | — | — |
| | Additive | Glass fiber | (part) | 66.7 | 66.7 | 66.7 | 66.7 | 66.7 | 66.7 | 66.7 | 66.7 |
| | | Organic amide compound | (part) | — | — | — | — | — | — | — | — |
| Physical property | Tensile strength MPa | | | 166 | 133 | 165 | 125 | 162 | 115 | 185 | 175 |
| | Tensile elongation % | | | 1.30 | 0.94 | 1.15 | 0.88 | 1.20 | 0.75 | 1.40 | 1.20 |
| | Flexural strength MPa | | | 220 | 186 | 215 | 185 | 224 | 175 | 235 | 220 |
| | Flexural modulus MPa | 23° C. | | 15000 | 14760 | 15210 | 14980 | 14280 | 14110 | 14000 | 14500 |
| | | 150° C. | | 7500 | 7500 | — | — | — | — | 5200 | — |
| | Maximum strain in bending % | | | 1.62 | 1.33 | 1.52 | 1.35 | 1.23 | 0.95 | 1.75 | 1.55 |
| | Melt viscosity Pa·s | | | 350 | 353 | 180 | 230 | 360 | 420 | 140 | 80 |
| | Flash length μm | | | 15 | 20 | 15 | 15 | 10 | 13 | 380 | 290 |

(Note)
(1) Formulation: The proportions of PAS and PAI designate wt. % (total: 100 wt. %), and the proportions of the other components designate parts or parts by weight per 100 parts by weight of the total amount of PAS and PAI.
(2) PAS (A): PPS (melt viscosity=55 Pa·s, pH=6.2, average particle size=about 500 μm) synthesized in Synthesis Example 1.
(3) PAS (B): PPS (melt viscosity=140 Pa·s, pH=6.5, average particle size=about 900 μm) synthesized in Synthesis Example 2.
(4) PAS (C): PPS (melt viscosity=24 Pa·s, pH=6.1, average particle size=about 300 μm) synthesized in Synthesis Example 3.
(5) Polyamide-imide: Polyamide-imide (reduced viscosity= 0.22 dl/g, glass transition temperature=323° C.) synthesized in accordance with the isocyanate process in Synthesis Example 4.
(6) Epoxysilane: γ-glycidoxypropyltrimethoxysilane.
(7) Mercaptosilane: γ-mercaptopropyltrimethoxysilane.
(8) Isocyanatosilane: γ-isocyanatopropyltriethoxysilane.
(9) Ureidosilane: γ-ureidopropyltriethoxysilane.
(10) Glass fiber: product of Nippon Electric Glass Co., Ltd.; diameter=13 μm).
(11) Organic amide compound: ε-caprolactam.

As apparent from the experimental results shown in Tables 5 and 6, the resin compositions to which the silane compound having a ureido, epoxy, isocyanate or mercapto group was added (Examples 15 to 23) are excellent in tensile strength, tensile elongation and melt-flow properties (lower melt viscosity) compared with their corresponding resin compositions (Comparative Examples 16 to 20) to which no silane compound was added. Further, the resin compositions (Examples 16 to 23) into which the glass fiber was compounded are also improved in flexural strength and maximum strain in bending. The resin composition (Example 18) into which the organic amide compound (ε-caprolactam) was compounded is low in melt viscosity and hence further improved in melt-flow properties.

The resin compositions (Comparative Examples 21 and 22) into which only PAS and glass fiber were compounded, and neither the polyamide-imide nor the silane compound having the specific functional group was compounded are low in flexural modulus at 150° C., insufficient in stiffness at a high temperature and extremely long in the length of flash compared with the resin compositions (Examples 17 to 21) in which the polyamide-imide, glass fiber and silane compound having the specific functional group were compounded into the PAS.

Examples 24 to 31 and Comparative Examples 23 to 30

Specimens for tensile test and flexural test were produced in the same manner as in Examples 1 to 6 except that the formulations were changed to their corresponding formulations shown in Tables 7 and 8. The formulations of the resin compositions and the measured results are shown in Tables 7 and 8.

TABLE 7

|  |  |  |  | Ex. 24 | Comp. Ex. 23 | Ex. 25 | Comp. Ex. 24 | Ex. 26 | Comp. Ex. 25 | Ex. 27 | Comp. Ex. 26 |
|---|---|---|---|---|---|---|---|---|---|---|---|
| Formulation | Resin | PAS (A) | (%) | 61.0 | 61.0 | — | — | — | — | — | — |
|  |  | PAS (B) | (%) | — | — | — | — | 60.0 | 60.0 | — | — |
|  |  | PAS (C) | (%) | — | — | 60.0 | 60.0 | — | — | 63.0 | 63.0 |
|  |  | PAI | (%) | 39.0 | 39.0 | 40.0 | 40.0 | 40.0 | 40.0 | 37.0 | 37.0 |
|  | Epoxysilane |  | (part) | 0.9 | — | 1.1 | — | 0.7 | — | 0.9 | — |
|  | Additive | PETS | (part) | 0.6 | 0.6 | 0.7 | 0.7 | — | — | — | — |
|  |  | Glass fiber | (part) | — | — | 70.0 | 70.0 | — | — | — | — |
|  |  | Carbon fiber | (part) | 43.1 | 43.1 | — | — | — | — | — | — |
|  |  | Aramid fiber | (part) | — | — | — | — | 11.0 | 11.0 | — | — |
|  |  | Carbon black | (part) | — | — | 3.5 | 3.5 | — | — | — | — |
|  |  | PTFE | (part) | — | — | — | — | — | — | 25.0 | 25.0 |
|  |  | Alumina | (part) | — | — | — | — | — | — | — | — |
|  |  | Silica | (part) | — | — | — | — | — | — | — | — |
|  |  | Ferrite | (part) | — | — | — | — | — | — | — | — |
|  |  | Potassium titanate | (part) | — | — | — | — | — | — | — | — |
| Physical property | Tensile strength MPa |  |  | 158 | Failure in molding | 138 | 82 | 90 | 68 | 82 | Failure in molding |
|  | Tensile elongation % |  |  | 0.45 |  | 0.5 | 0.3 | 8.6 | 3.2 | 2.5 |  |
|  | Flexural strength (23° C.) MPa |  |  | 230 |  | 200 | 132 | — | — | — |  |
|  | Flexural modulus (23° C.) MPa |  |  | 22060 |  | 14870 | 12560 | — | — | — |  |
|  | Maximum strain in bending % |  |  | 1.2 |  | 1.4 | 1.1 | — | — | — |  |
|  | Melt viscosity Pa·s |  |  | 324 | 755 | 360 | 793 | 310 | 342 | 340 | 740 |
|  | Volume resistivity Ω·cm |  |  | 8.6 | — | 67 | 1.0E+15 | — | — | — | — |

TABLE 8

|  |  |  |  | Ex. 28 | Comp. Ex. 27 | Ex. 29 | Comp. Ex. 28 | Ex. 30 | Comp. Ex. 29 | Ex. 31 | Comp. Ex. 30 |
|---|---|---|---|---|---|---|---|---|---|---|---|
| Formulation | Resin | PAS (A) | (%) | — | — | — | — | — | — | 60.0 | 60.0 |
|  |  | PAS (B) | (%) | — | — | — | — | — | — | — | — |
|  |  | PAS (C) | (%) | 60.0 | 60.0 | 60.0 | 60.0 | 60.0 | 60.0 | — | — |
|  |  | PAI | (%) | 40.0 | 40.0 | 40.0 | 40.0 | 40.0 | 40.0 | 40.0 | 40.0 |
|  | Aminoalkoxysilane (part) |  |  | 1.0 | — | 1.7 | — | 7.1 | — | 0.8 | — |
|  | Additive | PETS | (part) | — | — | — | — | — | — | — | — |
|  |  | Glass fiber | (part) | — | — | — | — | — | — | — | — |
|  |  | Carbon fiber | (part) | — | — | — | — | — | — | — | — |
|  |  | Aramid fiber | (part) | — | — | — | — | — | — | — | — |
|  |  | Carbon black | (part) | — | — | — | — | — | — | — | — |
|  |  | PTFE | (part) | — | — | — | — | — | — | 20.0 | 20.0 |
|  |  | Alumina | (part) | 235.0 | 233.0 | — | — | — | — | — | — |
|  |  | Silica | (part) | — | — | 68.0 | 68.0 | — | — | — | — |
|  |  | Ferrite | (part) | — | — | — | — | 567.0 | 567.0 | — | — |
|  |  | Potassium titanate | (part) | — | — | — | — | — | — | 13.3 | 13.3 |
| Physical property | Tensile strength MPa |  |  | — | — | — | — | — | Failure in molding | — | — |
|  | Tensile elongation % |  |  | — | — | — | — | — |  | — | — |
|  | Flexural strength (23° C.) MPa |  |  | 68 | 30 | 70 | 45 | 75 |  | 125 | 110 |
|  | Flexural modulus (23° C.) MPa |  |  | 22150 | 22050 | 6120 | 6050 | 20800 |  | 7520 | 7500 |
|  | Maximum strain in bending % |  |  | — | — | — | — | — |  | 2.4 | 1.8 |
|  | Melt viscosity Pa·s |  |  | 390 | 480 | 142 | 190 | 255 | 300 | 272 | 310 |
|  | Volume resistivity Ω·cm |  |  | — | — | — | — | — | — | — | — |

(Note)
(1) Formulation: The proportions of PAS and PAT designate wt. % (total: 100 wt. %), and the proportions of the other components designate parts or parts by weight per 100 parts by weight of the total amount of PAS and PAI.
(2) PAS (A): PPS (melt viscosity=55 Pa·s, pH=6.2, average particle size=about 500 μm) synthesized in Synthesis Example 1.
(3) PAS (B): PPS (melt viscosity=140 Pa·s, pH=6.5, average particle size about 900 μm) synthesized in Synthesis Example 2.
(4) PAS (C): PPS (melt viscosity=24 Pa·s, pH=6.1, average particle size=about 300 μm) synthesized in Synthesis Example 3.
(5) Polyamide-imide: Polyamide-imide (reduced viscosity= 0.22 dl/g, glass transition temperature 323° C.) synthesized in accordance with the isocyanate process in Synthesis Example 4.
(6) Epoxysilane: γ-glycidoxypropyltriethoxysilane.
(7) PETS: Unistar 11476, product of Nippon Oil & Fats Co., Ltd.,; pentaerythritol tetrastearate (lubricant).
(8) Glass fiber: product of Nippon Electric Glass Co., Ltd.; diameter=13 μm)
(9) Carbon fiber: PAN type Carbon Fiber CFC-E3, product of Lignite Co.
(10) Aramid fiber: Technola T-322EP, product of Teijin Limited.
(11) Carbon black: Ketjen Black EC600JD, product of Lion Corporation (DBP oil absorption=500 ml/100 g).
(12) PTFE: Polytetrafluoroethylene, KT-400M, product of K. K. Kitamura.
(13) Alumina: AS-50, product of Showa Denko K. K.
(14) Silica: FB-74, product of Denki Kagaku Kogyo Kabushiki Kaisha.
(15) Ferrite: NP-20, product of Nippon Bengara Kogyo Co., Ltd.

(16) Potassium titanate: D102 (whisker), product of Tismo Co.

As apparent from the experimental results shown in Tables 7 and 8, when the functional group-containing silane compound was added to the resin compositions into which the carbon fiber (fibrous filler), PTFE (fluorocarbon resin) and ferrite (inorganic filler) were respectively compounded (Examples 24, 27 and 30), the resin compositions were able to be subjected to molding and exhibited excellent melt-flow properties and mechanical properties. On the other hand, when no functional group-containing silane compound was added (Comparative Examples 23, 26 and 29), such resin compositions were unable to retain the form of molded articles, and the melt-flow properties were also poor.

When the functional group-containing silane compound was added to the resin compositions into which the glass fiber and carbon black, the Aramid fiber, the alumina, the silica, and the PTFE and potassium titanate whisker were respectively compounded (Examples 25, 26, 28, 29 and 31), the flow properties and mechanical properties were improved to a great extent compared with their corresponding resin compositions to which no functional group-containing silane compound was added (Comparative Examples 24, 25, 27, 28 and 30). In the case of the resin compositions into which the glass fiber and carbon black were compounded, the electrical resistivity can be greatly lowered by compounding the functional group-containing silane (Example 25) even when only a small amount of the carbon black was compounded, as compared with the case where no functional group-containing silane was added (Comparative Example 24).

INDUSTRIAL APPLICABILITY

According to the present invention, there are provided thermoplastic resin compositions improved in compatibility between PAS and polyamide-imide and having excellent molding or forming ability, melt-flow properties and mechanical properties. The charged amount of the polyamide-imide to the PAS can be increased by adding the functional group-containing silane compound thereto. When an epoxy group-containing silane compound is added, the melt viscosity of the resulting resin composition can be lowered to enhance its flow properties over a wide range of the compositional ratio of the polyamide-imide content in the PAS.

In the thermoplastic resin composition according to the present invention, both elastic modulus of the PAS at a high temperature and injection moldability of the polyamide-imide are improved, and the flash length upon injection molding is reduced. Accordingly, the resin compositions according to the present invention can be molded or formed into sheets, films, tubes or other molded or formed products by the conventional melt processing techniques such as injection molding and extrusion. The molded or formed products thus obtained can be applied to a wide variety of field of which stiffness at a high temperature of 100° C. or higher, flame retardancy, heat resistance, chemical resistance, dimensional stability, mechanical properties, and the like are required.

The unfilled thermoplastic resin compositions and glass fiber-filled thermoplastic resin compositions are suitable for use as insulating materials in a wide variety of fields. The carbon fiber-filled thermoplastic resin compositions are suitable for use as electrically conductive materials or sliding materials. The Aramid fiber-, PTFE- or potassium titanate fiber-filled thermoplastic resin compositions are suitable for use as sliding materials. The alumina-filled thermoplastic resin compositions are suitable for use as heat-conductive materials. The silica-filled thermoplastic resin compositions are substituted for use as sealing materials. The ferrite-filled thermoplastic resin compositions are suitable for use as magnetic materials.

What is claimed is:

1. A thermoplastic resin composition comprising 100 parts by weight of a resin component containing 40 to 99 wt. % of a poly(arylene sulfide) (A) and 1 to 60 wt. % of a polyamide-imide (B), and 0.1 to 10 parts by weight of a silane compound (C) containing at least one functional group selected from the group consisting of amino, ureido, epoxy, isocyanate and mercapto groups, wherein the resin composition optionally comprises 0–800 parts by weight of a filler per 100 parts by weight of the resin composition, wherein the filler optionally comprises a surface-treating agent, and wherein the silane compound (C) is in addition to any surface-treating agent for the filler.

2. The thermoplastic resin composition according to claim 1, wherein the poly(arylene sulfide) (A) has a melt viscosity within a range of 10 to 500 Pa·s as measured at 310° C. and a shear rate of 1200/sec.

3. The thermoplastic resin composition according to claim 1, wherein the poly(arylene sulfide) (A) has a pH of at most 8.0 in a 1:2 (by volume) mixed solvent of acetone and water.

4. The thermoplastic resin composition according to claim 1, wherein the polyamide-imide (B) is a polyamide-imide obtained in accordance with a process in which an aromatic tricarboxylic acid anhydride and a diisocyanate are reacted with each other in a solvent.

5. The thermoplastic resin composition according to claim 1, which further comprises an organic amide compound.

6. The thermoplastic resin composition according to claim 1, which further comprises any other thermoplastic resin.

7. The thermoplastic resin composition according to claim 6, wherein said any other thermoplastic resin is polytetrafluoroethylene.

8. The thermoplastic resin composition according to claim 1, which further comprises a filler.

9. The thermoplastic resin composition according to claim 8, wherein the filler is at least one fibrous filler.

10. The thermoplastic resin composition according to claim 9, wherein the fibrous filler is at least one selected from the group consisting of glass fiber, carbon fiber, Aramid fiber and potassium titanate fiber.

11. The thermoplastic resin composition according to claim 8, wherein the filler is at least one non-fibrous filler.

12. The thermoplastic resin composition according to claim 11, wherein the non-fibrous filler is ferrite.

13. The thermoplastic resin composition according to claim 11, wherein the non-fibrous filler is an electrically conductive filler.

14. The thermoplastic resin composition according to claim 13, wherein the electrically conductive filler is electrically conductive carbon black.

15. The thermoplastic resin composition according to claim 11, wherein the non-fibrous filler is magnetic powder.

16. The thermoplastic resin composition according to claim 15, wherein the magnetic powder is ferrite.

17. The thermoplastic resin composition according to claim 11, wherein the non-fibrous filler is alumina.

18. The thermoplastic resin composition according to claim 11, wherein the non-fibrous filler is silica.

19. The thermoplastic resin composition according to claim 8, wherein the filler comprises at least one fibrous filler and at least one non-fibrous filler.

20. The thermoplastic resin composition according to claim 19, wherein the filler comprises at least one fibrous filler and electrically conductive carbon black.

21. The thermoplastic resin composition according to claim 1, which further comprises at least one other thermoplastic resin and at least one filler.

22. The thermoplastic resin composition according to claim 21, which further comprises polytetrafluoroethylene and potassium titanate fiber.

23. The thermoplastic resin composition according to claim 1, wherein the functional group-containing silane compound (C) is an alkoxysilane compound or halosilane compound containing at least one functional group selected from the group consisting of amino, ureido, epoxy, isocyanate and mercapto groups.

24. The thermoplastic resin composition according to claim 23, wherein the functional group-containing alkoxysilane compound is a functional group-substituted alkyl.alkoxysilane compound having a functional group-substituted alkyl group and an alkoxy group.

25. The thermoplastic resin composition according to claim 24, wherein the functional group-substituted alkyl group in the functional group-substituted alkyl.alkoxysilane compound has 1 to 4 carbon atoms, and the alkoxy group has 1 to 4 carbon atoms.

26. The thermoplastic resin composition according to claim 25, wherein the functional group-substituted alkyl.alkoxysilane compound is a γ-aminopropyl.trialkoxysilane compound, γ-glycidoxypropyl.trialkoxysilane, γ-mercaptopropyl.trialkoxysilane, γ-isocyanatopropyl.trialkoxysilane or γ-ureidopropyl.trialkoxysilane.

27. The thermoplastic resin composition according to claim 23, wherein the epoxy group-containing silane compound is at least one selected from the group consisting of γ-glycidoxypropyltrimethoxysilane, γ-glycidoxypropyldimethylmethoxysilane, γ-glycidoxypropyltriethoxysilane, γ-glycidoxypropylmethyldiethoxysilane, β-(3,4-epoxycyclohexyl)ethyltrimethoxysilane and β-(3,4-epoxycyclohexyl)ethyltriethoxysilane.

28. The thermoplastic resin composition according to claim 1, wherein the resin composition exhibits an increase in tensile strength and tensile elongation as compared with the same resin composition which omits the silane compound (C).

29. The thermoplastic resin composition according to claim 1, wherein the resin composition comprises 1–300 parts by weight of the filler per 100 parts by weight of the resin composition.

* * * * *